UNITED STATES PATENT OFFICE.

GEORG EICHELBAUM, OF BERLIN, GERMANY.

METHOD OF PURIFYING ALBUMEN.

SPECIFICATION forming part of Letters Patent No. 662,779, dated November 27, 1900.

Application filed May 27, 1899. Serial No. 718,468. (No specimens.)

*To all whom it may concern:*

Be it known that I, GEORG EICHELBAUM, a subject of the German Emperor, residing at Berlin, Charlottenburg, German Empire, have invented certain new and useful Improvements in the Purification of Albuminous Substances; and I do hereby declare the following to be a full, clear, and exact description of the invention, such as will enable others skilled in the art to which it appertains to make and use the same.

The present invention relates to the preparation of albuminous substances; and it consists in a method of purifying products containing albumen or protein substances in such a manner that the resultant albumens are fit for use as articles of diet and for other purposes.

Albuminoid products, both of animal and vegetable origin, are generally accompanied by substances having a disagreeable odor and taste, which render them albumens unfit for consumption. These objectionable substances of unpleasant odor and taste are particularly prominent in those waste products which are obtained in the treatment of meats—*e. g.*, such as meat-meal, fish-meal, cadaver-meal, and the like. I have found that the malodorous and ill-flavored matters may be effectually separated from such raw material if the same are heated with an alcoholic liquor to a temperature above the boiling-point of alcohol and under pressure, the result of such treatment being that the objectionable ill-flavored and ill-smelling admixtures are taken up by the alcohol, while the purified albumen remains undissolved. After removing the alcoholic solution containing the impurities the residual albumen is in a pure condition and is then ready for use for its various purposes. The temperature above the boiling-point is obtained by heating the mixture of impure albuminous substance and alcohol under pressure.

The following example embodies the preferred manner of carrying out my invention: I take a suitable quantity of the albuminous substance to be treated and mix the same with alcohol, preferably of a high degree of concentration. This mixture is brought into a vessel permitting the application of pressure, such as a digester, and I heat the mixture to a temperature above 80° centigrade, preferably from 100° to 105° centigrade. The amount of alcohol to be added depends on the nature of the particular material to be treated and on the impurities or foreign matters contained in the same and may be readily ascertained by tests. After the mixture has been maintained at the above temperature for a sufficient period of time, to be determined by testing samples of the mixture, the whole is allowed to cool, and then the alcoholic liquid is separated from the undissolved albumen. The further treatment of the purified albumen may proceed according to any of the known methods.

The effect of the above alcoholic liquor may be enhanced and the albumen decolorized coincidently with the removal of the ill-flavored and ill-smelling impurities if the same is made to consist not of alcohol alone, but preferably of alcohol in which ammonia or sulfurous acid is dissolved. By this addition not only a bleaching or decolorization of the albumen is obtained, but at the same time a further increase of pressure without any further increase of temperature is produced, so that the removal of the aforesaid impurities is effected with great despatch and more thoroughly.

The process may be carried out as follows: The raw material (meat-meal, fish, glutens) is saturated with three or four times its weight of 90° alcohol, which may be saturated with sulfurous acid or ammonia, and is heated in autoclaves or digesters for from five to six hours under a pressure of 100° centigrade. The choice of the temperature depends on the material chosen and the desired length of the operation, as well as on the degree of purification desired. The only condition is that the alcohol be above boiling-point, so that there is a suitable pressure. The cooled treated mass is pressed in a filter and washed with much hot water and dried. A grayish white or yellow powder is obtained which is entirely tasteless and oderless, which feels gritty on the tongue, and can be used direct for human or animal food.

What I claim, and desire to secure by Letters Patent, is—

1. The process of purifying vegetable and animal albuminoid substances which consists in heating such substances together with an alcoholic liquor containing a decolorizing agent under pressure to a temperature above the boiling-point of alcohol.

2. The process of purifying vegetable and animal albuminoid substances which consists in heating such substances together with an alcoholic liquor containing sulfurous acid under pressure to a temperature above the boiling-point of alcohol.

In testimony whereof I have affixed my signature in presence of two witnesses.

GEORG EICHELBAUM.

Witnesses:
 HENRY HASPER,
 WOLDEMAR HAUPT.